United States Patent
Yang et al.

(10) Patent No.: US 11,500,587 B2
(45) Date of Patent: Nov. 15, 2022

(54) SYSTEM AND METHOD FOR IN-SSD DATA PROCESSING ENGINE SELECTION BASED ON STREAM IDS

(71) Applicant: Samsung Electronics Co., Ltd., Suwon-si (KR)

(72) Inventors: Jing Yang, San Jose, CA (US); Jingpei Yang, San Jose, CA (US); Rekha Pitchumani, Oak Hill, VA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/117,008

(22) Filed: Dec. 9, 2020

(65) Prior Publication Data

US 2022/0164138 A1    May 26, 2022

Related U.S. Application Data

(60) Provisional application No. 63/116,685, filed on Nov. 20, 2020.

(51) Int. Cl.
*G06F 3/06* (2006.01)

(52) U.S. Cl.
CPC .......... *G06F 3/0659* (2013.01); *G06F 3/0613* (2013.01); *G06F 3/0658* (2013.01); *G06F 3/0679* (2013.01)

(58) Field of Classification Search
CPC .... G06F 3/0659; G06F 3/0613; G06F 3/0658; G06F 3/0679
USPC ....................................................... 711/102
See application file for complete search history.

(56) References Cited

U.S. PATENT DOCUMENTS

| | | | |
|---|---|---|---|
| 8,069,298 B2 | 11/2011 | Chang et al. | |
| 8,918,579 B2 | 12/2014 | Kettner | |
| 9,338,005 B2 | 5/2016 | Fascenda et al. | |
| 9,558,282 B2 | 1/2017 | Biderman et al. | |
| 9,760,502 B2 | 9/2017 | Raam | |
| 10,055,171 B2 | 8/2018 | Horn | |
| 10,379,761 B2 | 8/2019 | Mutha et al. | |
| 2016/0283125 A1* | 9/2016 | Hashimoto | G06F 16/166 |
| 2016/0283159 A1* | 9/2016 | Gopal | H03M 7/3095 |
| 2016/0313943 A1* | 10/2016 | Hashimoto | G06F 3/0659 |
| 2017/0017663 A1* | 1/2017 | Huo | G06F 3/0688 |

(Continued)

OTHER PUBLICATIONS

Choi, PhD, C., "Multi-Stream Write SSD Increasing SSD Performance and Lifetime with Multi-Stream Write Technology, Flash Memory Summit," 2016, 20 pages.

(Continued)

*Primary Examiner* — Christopher B Shin
(74) *Attorney, Agent, or Firm* — Lewis Roca Rothgerber Christie LLP

(57) ABSTRACT

A multi-stream memory system includes an in-device data processor including a first data processing engine and a second data processing engine, a controller processor, and a processor memory coupled to the controller processor, wherein the processor memory has stored thereon instructions that, when executed by the controller processor, cause the controller processor to perform: identifying a stream ID of an input stream, identifying the first data processing engine as being associated with the stream ID based on a stream assignment table, and applying the first data processing engine to the input stream to generate processed data.

19 Claims, 4 Drawing Sheets

(56) References Cited

U.S. PATENT DOCUMENTS

| | | | | |
|---|---|---|---|---|
| 2017/0371585 A1* | 12/2017 | Lazo | ............... | G06F 3/0659 |
| 2018/0059988 A1* | 3/2018 | Shivanand | ............ | G06F 3/0659 |
| 2018/0321855 A1* | 11/2018 | Martineau | ............. | G06F 3/0649 |
| 2020/0057715 A1* | 2/2020 | Benisty | ................ | G06F 3/0659 |
| 2021/0240632 A1* | 8/2021 | Jeon | ..................... | G06F 12/10 |
| 2021/0326067 A1* | 10/2021 | Li | ....................... | G06F 3/0604 |

OTHER PUBLICATIONS

Haratsch, E.F., "SSD with Compression: Implementation, Interface and Use Case, Flash Memory Summit, Seagate Technology," 2019, 11 pages.
Vatto, K., "Samsung SSD 850 EVO (120GB, 250GB,500GB & ITB) Review," AnandTech, Dec. 8, 2014, 5 pages.
Sumsung Solid State Drive Turbo Write Technology, White Paper, 2013 Samsung Electronics Co., 6 pages.
"Samsung Electronics Sets New Performance Standards for NVMe SSDs with 970 PRO and EVO," Samsung Newsroom, Korea Apr. 24, 2018, 7 pages.

\* cited by examiner

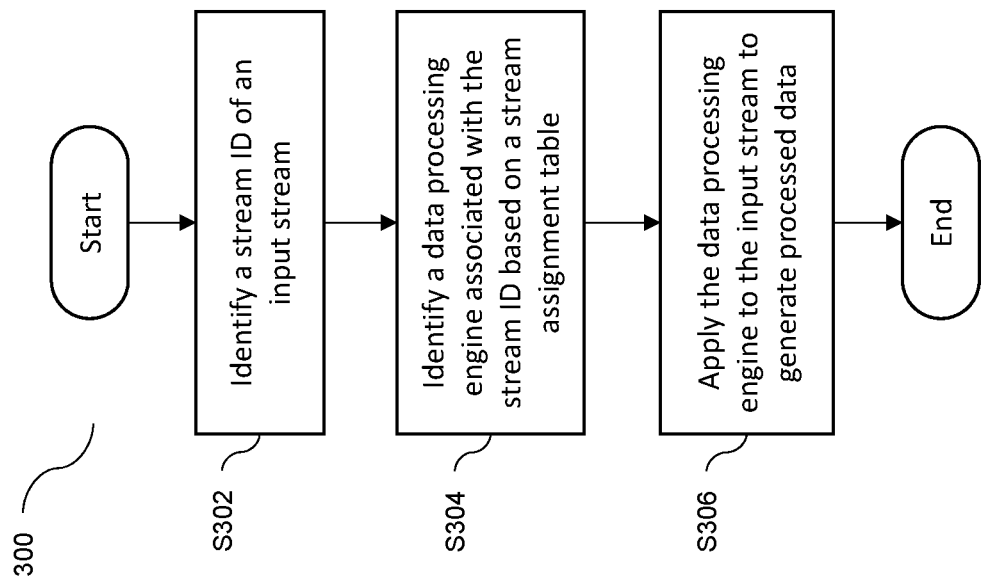

SYSTEM AND METHOD FOR IN-SSD DATA PROCESSING ENGINE SELECTION BASED ON STREAM IDS

CROSS-REFERENCE TO RELATED APPLICATION(S)

This application claims priority to, and the benefit of, U.S. Provisional Application No. 63/116,685 ("SYSTEM AND METHOD FOR IN SSD DATA PROCESSING ENGINE SELECTION BASED ON STREAM IDS"), filed on Nov. 20, 2020, the entire content of which is incorporated herein by reference.

FIELD

Aspects of the present invention relate to the field of memory devices.

BACKGROUND

A solid-state drive/solid-state disk (SSD) is a solid-state storage device that uses integrated circuit (IC) assemblies as memory to persistently store data. SSD technology typically utilizes electronic interfaces that are compatible with traditional block input/output (I/O) hard disk drives (HDDs), thereby providing easy replacement in many common applications.

A concept referred to as "multi-stream SSD" provides operating systems and applications with interfaces that separately store data with different attributes. These individual data stores are referred to as "streams." Streams may be used to indicate when different data writes are associated with one another or have a similar lifetime. That is, a group of individual data writes may be a part of a collective stream, and each stream is identified by a stream ID that is assigned by the operating system or a corresponding application. Accordingly, different data having similar characteristics, or attributes, can each be assigned a unique stream ID such that data corresponding to that stream ID can be written to a same block in the SSD.

Currently, some SSDs allow for device-side processing, such as compression or encryption of data within the SSD. Processing data in the SSD may provide numerous benefits, such as reducing host-side processing time and CPU/memory consumption in a manner that may be transparent to applications.

The SSDs of the related art treat all incoming data, such as data with different stream IDs, in the same manner. For example, all incoming data may be compressed and/or encrypted regardless of source or stream ID. However, typically, not all data needs to be compressed or encrypted. For instance, compressing already compressed data may result in larger than original data size due to metadata overhead, and temporary data resulting from data processing may not need to be encrypted.

Moreover, compression and encryption requirements may vary among applications. For examples, some applications may benefit from high compression ratios while others may benefit from high compression speeds. However, these effects cannot generally be achieved at the same time as, for example, high-compression algorithms have slow compression speeds. Furthermore, different applications may require different encryption strengths, such as RSA or AES. Therefore, treating all incoming streams the same way at the SSD can introduce inefficiencies and undesirable results.

The above information disclosed in this Background section is only for enhancement of understanding of the invention, and therefore it may contain information that does not form the prior art that is already known to a person of ordinary skill in the art.

SUMMARY

Aspects of embodiments of the present disclosure are directed toward multi-streaming memory systems capable of in-SSD data processing engine selection based on stream IDs of incoming data. In some embodiments, the multi-streaming memory system improves performance and reduces power consumption by bypassing a compression engine when a data stream cannot benefit from the compression and/or by bypassing an encryption engine when a data stream cannot benefit from the encryption.

According to an embodiment of the present invention, there is provided a multi-stream memory system including: an in-device data processor including a first data processing engine and a second data processing engine; a controller processor; and a processor memory coupled to the controller processor, wherein the processor memory has stored thereon instructions that, when executed by the controller processor, cause the controller processor to perform: identifying a stream ID of an input stream; identifying the first data processing engine as being associated with the stream ID based on a stream assignment table; and applying the first data processing engine to the input stream to generate processed data.

In some embodiments, wherein the stream assignment table maps a plurality of stream IDs including the stream ID to a plurality of data processing engines including the first and second data processing engines.

In some embodiments, the first data processing engine is configured to perform an operation different from the second data processing engine.

In some embodiments, the first data processing engine performs at least one of compression, encryption, deduplication, search, and graphics processing.

In some embodiments, the instructions further cause the processor to perform: identifying the second data processing engine as not being associated with the stream ID based on the stream assignment table; and in response to the identifying, bypassing the second data processing engine for the processed data.

In some embodiments, the instructions further cause the processor to perform: identifying the second data processing engine as being associated with the stream ID based on the stream assignment table; and in response to the identifying, applying the second data processing engine to the processed data.

In some embodiments, the in-device data processor is internal to and integrated with a solid state drive (SSD) of the multi-stream memory system including the memory and the processor.

In some embodiments, the stream assignment table maps a plurality of stream IDs including the stream ID to a plurality of physical addresses within one or more memory devices of the multi-stream memory system.

In some embodiments, the instructions further cause the processor to perform: identifying a physical address associated with the stream ID based on the stream assignment table; and storing the processed data at the physical address within a memory device of the multi-stream memory system.

In some embodiments, the instructions further cause the processor to perform: generating metadata associated with the processed data, the meta data indicating application of the first data processing engine to the input stream; and storing the metadata along with the processed data at the physical address within a memory device of the multi-stream memory system.

In some embodiments, applying the identified one of the first and second data processing engines includes: compressing the input stream by a first compression engine to generate compressed data, and wherein the instructions further cause the processor to perform: monitoring a compression ratio of the compressed data; determining that the compression ratio is below a threshold; and In response to the determining, bypassing the identified one of the first and second data processing engines for a remainder of input stream.

In some embodiments, the instructions further cause the processor to perform: providing the stream assignment table to a host, the host being a source of the input stream.

According to an embodiment of the present invention, there is provided a multi-stream memory system including: an in-device data processor including a data processing engine; a controller processor; and a processor memory coupled to the controller processor, wherein the processor memory has stored thereon instructions that, when executed by the controller processor, cause the controller processor to perform: identifying a first stream ID of a first input stream; identifying a second stream ID of a second input stream; determining that the first stream ID is associated with the data processing engine based on a stream assignment table; applying the data processing engine to the first input stream; and bypassing the data processing engine for the second input stream.

In some embodiments, the instructions further cause the processor to perform: determining that the second stream ID is not associated with the data processing engine based on the stream assignment table.

In some embodiments, the stream assignment table maps a plurality of stream IDs including the stream ID to a plurality of physical addresses within one or more memory devices of the multi-stream memory system.

In some embodiments, the instructions further cause the processor to perform: identifying a physical address associated with the second stream ID based on the stream assignment table; and storing the second input stream at the physical address within a memory device of the multi-stream memory system.

According to an embodiment of the present invention, there is provided a method of processing an input stream in a multi-stream memory system, the method including: identifying a stream ID of an input stream; identifying a first data processing engine of an in-device data processor as being associated with the stream ID based on a stream assignment table, the in-device data processor including a second data processing engine; and applying the first data processing engine to the input stream to generate processed data.

In some embodiments, the stream assignment table maps a plurality of stream IDs including the stream ID to a plurality of data processing engines including the first and second data processing engines.

In some embodiments, the method further includes: identifying the second data processing engine as not being associated with the stream ID based on the stream assignment table; and in response to the identifying, bypassing the second data processing engine for the processed data.

In some embodiments, the method further includes: receiving the input stream from a host, wherein the host associates the input stream with the stream ID.

BRIEF DESCRIPTION OF THE DRAWINGS

These and other aspects of the present invention will be appreciated and understood with reference to the specification, claims, and appended drawings, wherein:

FIG. 4 is a flow diagram illustrating a method of processing an input stream in a multi-stream memory system, according to some example embodiments of the present disclosure.

DETAILED DESCRIPTION

Figure 1:
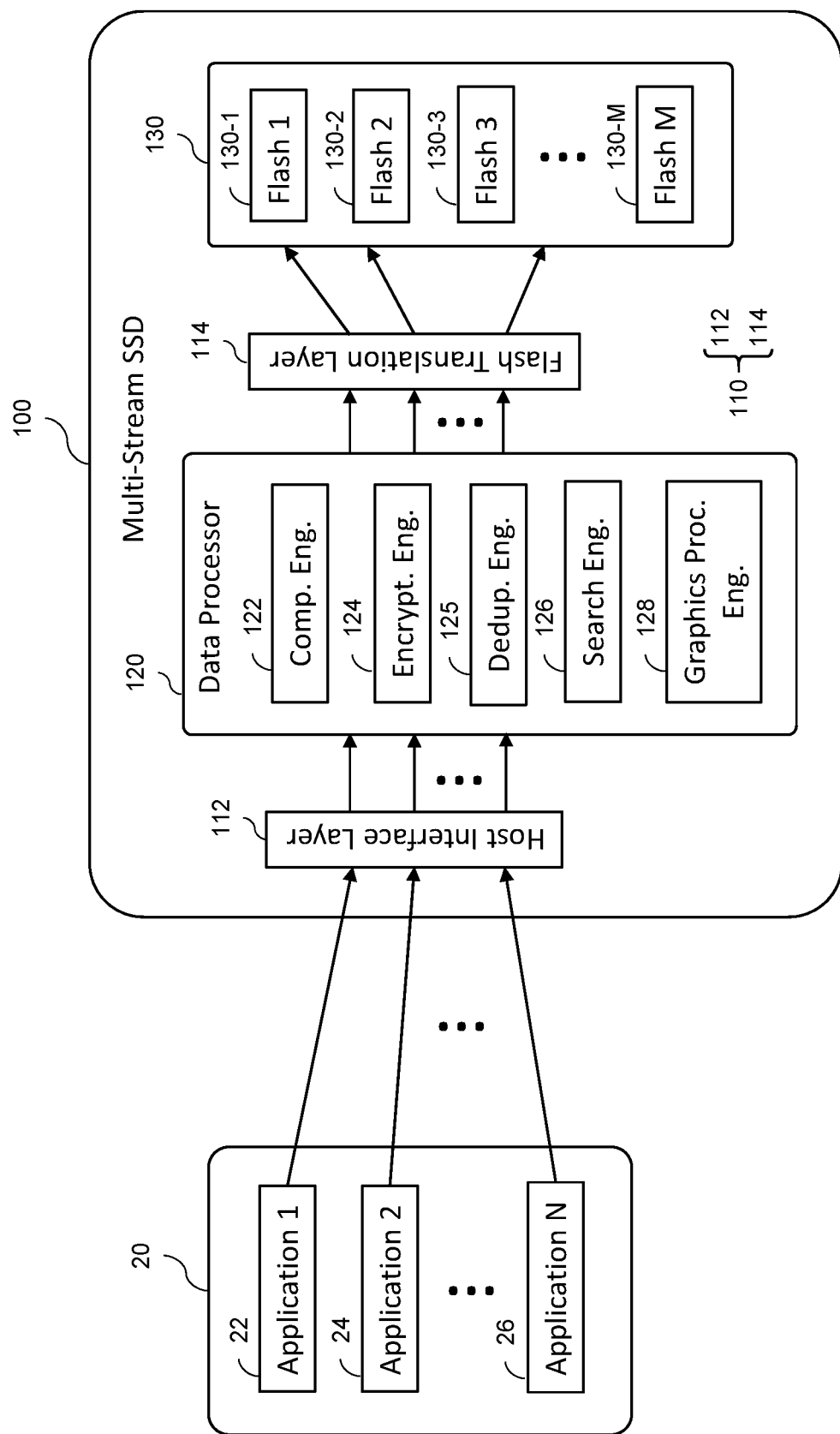
FIG. 1 is a block diagram illustrating a multi-stream memory system with in-SSD data processing, according to some embodiments of the present disclosure.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In the storage stack of the related art, host data from different applications are mixed before sending to the solid-state drive (SSD). All data is compressed or encrypted inside SSD of the related art if the SSD compression or encryption engine is enabled. The compression/encryption engine may be turned off by an administration command if it is known a dataset has a low compression ratio or does not need to be encrypted. However, as there is only one data stream in SSD of the related art, turning off the compression/encryption engine affects data from other applications as well, even when those other applications may have benefited from compression/encryption processing at the SSD.

Accordingly, aspects of the present disclosure provide a multi-stream memory system (e.g., a multi-stream flash drive) including a compression engine and/or an encryption engine and capable of selectively bypassing the compression engine and/or the encryption engine for data streams that cannot benefit from compression and/or encryption. In some embodiments, the multi-stream memory system is capable of selecting an appropriate data processing engine (e.g., a compression engine or an encryption engine) based on application requirements. In some embodiments, the multi-stream memory system selectively compresses and/or encrypts a stream based its stream ID, which may be assigned by either a host or the multi-stream memory system. According to some embodiments, the controller of the multi-stream memory system can automatically determine if a data stream should be compressed based on the corresponding data stream's compression ratio and/or compression speed.

Figure 2:
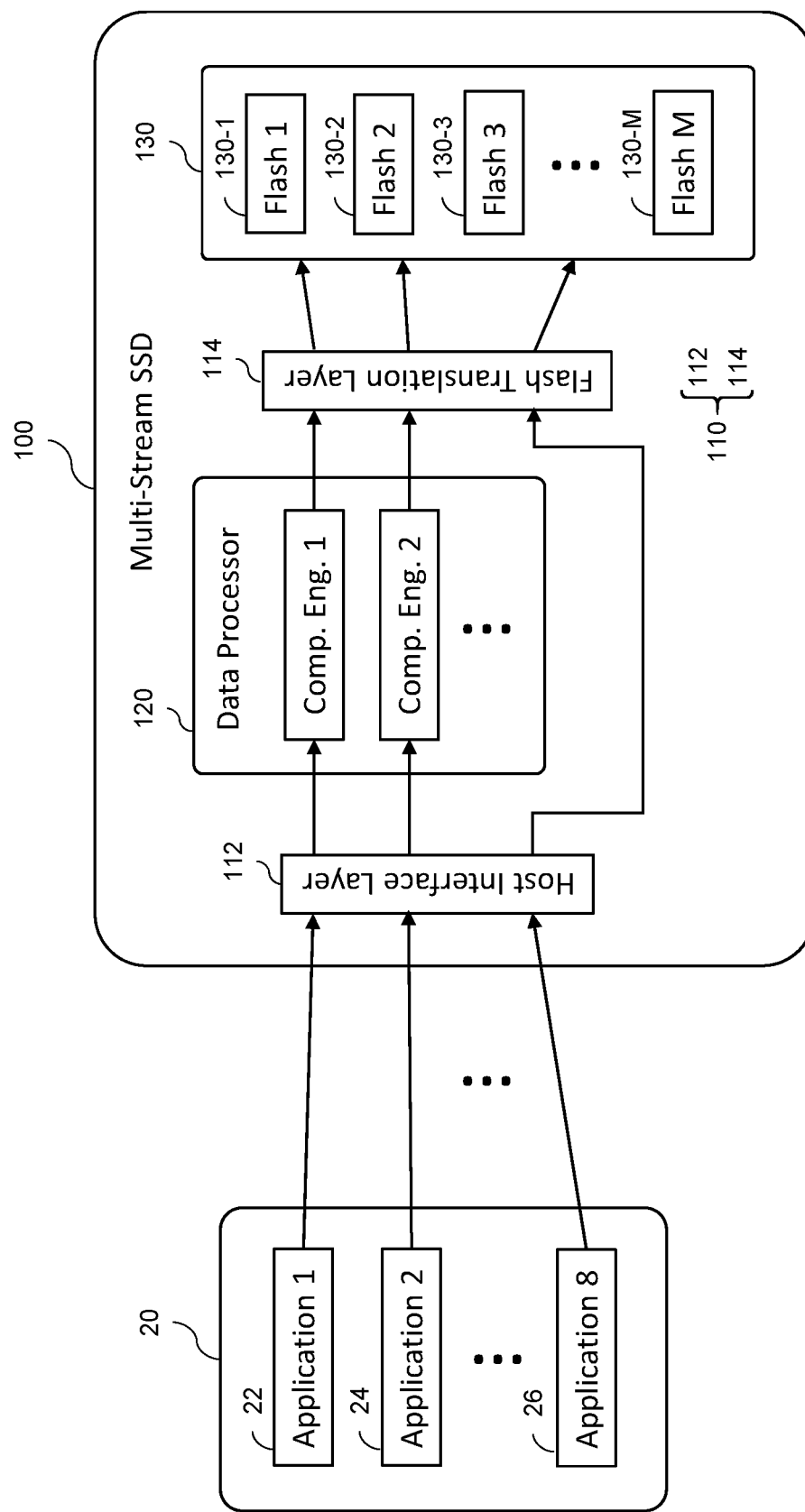
FIG. 2 is a illustrates an example in which the multi-stream memory system bypasses the in-device data processing engines within the SSD for a particular stream, while performing in-device data processing for other streams, according to some embodiments of the present disclosure.
Figure 3:
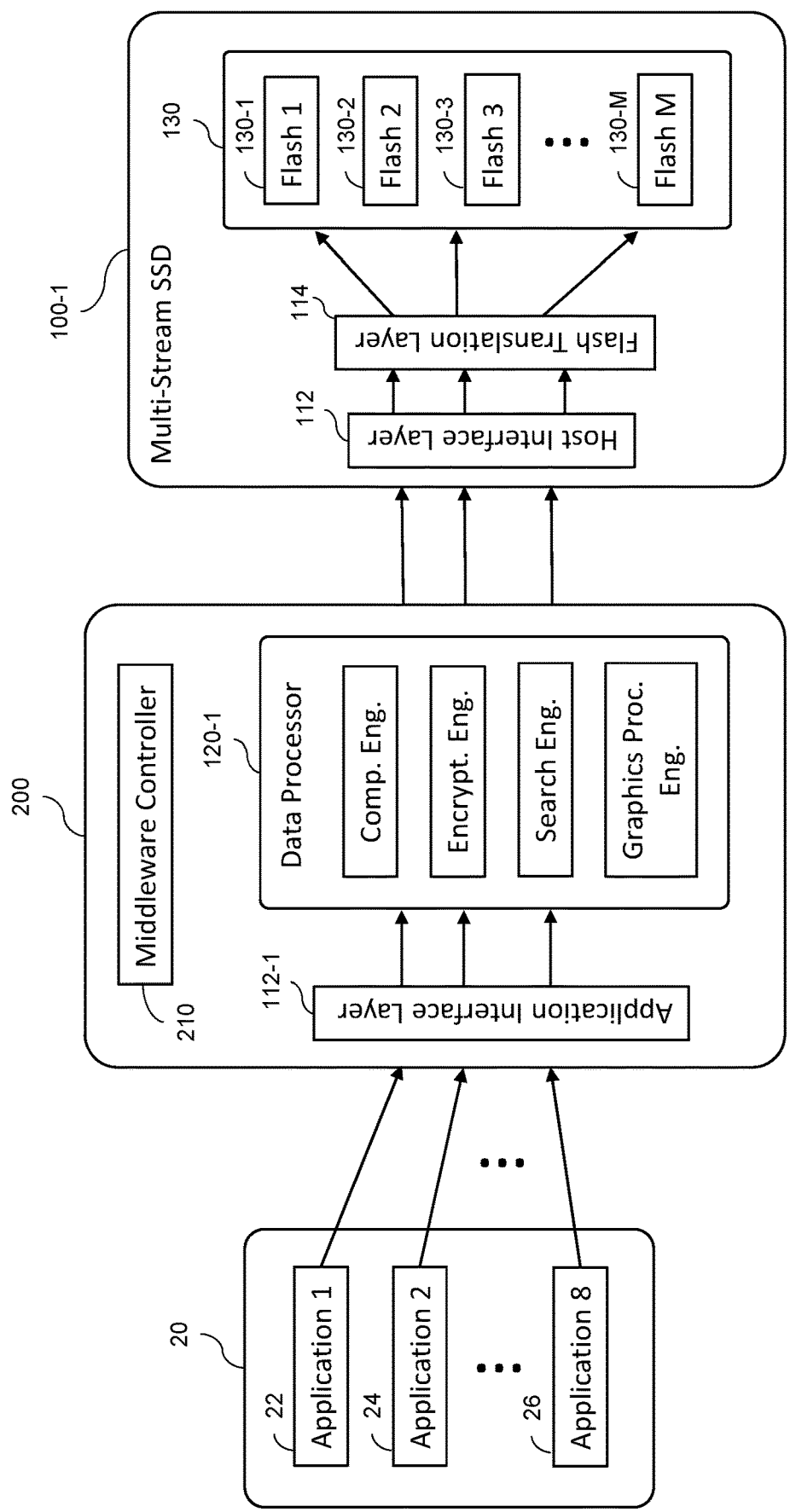
FIG. 3 is a block diagram illustrating a multi-stream memory system utilizing middleware data processing, according to some embodiments of the present disclosure.

FIG. 1 is a block diagram illustrating a multi-stream memory system with in-SSD data processing, according to some embodiments of the present disclosure. FIG. 2 is a illustrates an example in which the multi-stream memory system bypasses the in-device data processing engines within the SSD for a particular stream, while performing in-device data processing for other streams, according to some embodiments of the present disclosure. FIG. 3 is a block diagram illustrating a multi-stream memory system utilizing mid-ware data processing, according to some embodiments of the present disclosure.

Referring to FIG. 1, in some embodiments, the multi-stream memory system 10 includes a multi-stream SSD (e.g., a multi-stream flash drive) 100 with in-device data processing that is in data communication with a host 20. The multi-stream SSD 100 includes an SSD controller 110, an in-device data processor 120, which is internal to and integrated with the multi-stream SSD 100, and a non-volatile memory including a plurality of memory devices 130-1 to 130-M (where M is an integer greater than 1). In some examples, the memory devices 130 may be flash memory devices (e.g., NAND flash memory devices).

The SSD controller 110 facilitates the transfer of data between the host 20 and the SSD 100 through a plurality of streams 1 to N (where N is an integer greater than 1). In some embodiments, the SSD controller 110 includes a host interface layer 112 and a flash translation layer (FTL) 114. The host interface layer 112 fetches application I/O requests from the host 20, translates the I/O requests into SSD internal read/write transactions and schedules them to the FTL 114. The flash translation layer (FTL) 114 acts as a translation layer between the sector-based file system of the host 20 and the memory devices 130 of the SSD 100. The host interface layer 112 and the FTL 114 may be implemented in software and/or hardware. The FTL 114 provides the operating system and the file system on the host side access to the memory devices 130 and ensures that they behave (or appear) as one block storage device. In some examples, the FTL 114 hides the complexity of flash by providing a logical block interface to the flash memory device 130 by mapping the host's logical addresses to the flash memory's physical addresses in a logical to physical (LtoP) table.

The data processor 120 acts as an embedded computer within the SSD 100 and performs in-device data processing, such as compression/decompression, encryption/decryption, searching operations, and/or graphics processing, for incoming and outgoing streams of data. The data processor 120 shifts processing close to where the data is stored and thus reduces the need to move data, which may be an expensive operation in terms of time and energy. For example, when running a search, normally, large amounts of data on the storage device would have to be moved over to the host, and searched on the host. However, with the in-device data processor 120, one can send the inquiry to the SSD 100 itself, and have the data processor 120 perform the search, and simply return the result. As shown in FIG. 1, the data processor 120 may include one or more compression engines 122, one or more encryption engines 124, one or more deduplication engines 125, one or more search engines 126, and/or one or more graphics processing engines 128. However, embodiments of the present invention are not limited thereto, and any suitable engine may be contained within the data processor 120. In some examples, the one or more compression engines 122 may perform at least one of brotli, gzip, libdeflate, lzfse, and zstd compressions, and the one or more encryption engines 124 may perform at least one of chacha20-ietf, aes-256-gcm, aes-256-cfb, aes-256-ctr, and camellia-256-cfb encryptions.

According to some embodiments, the SSD controller 110 selectively applies data processing to streams based on their stream ID. In the multi-stream SSD, each input/output stream may be identified by a unique stream ID, which may be encoded in the I/O command (e.g., by the host). The SSD controller 110 may enable or disable a particular data processing engine for a given stream ID based on a stream assignment table, which maps each stream ID to one or more actions to be taken by the SSD 100. The actions may, for example, include data placement, compression, encryption, search, and graphics processing. In some embodiments, the stream assignment table is coded in the firmware of the SSD 100, and is made available to the host 20. Therefore, each application running at the host 20 may determine an appropriate stream ID to use for its intended purpose.

Table 1 below illustrates an example of the stream assignment table in a multi-stream SSD 100 supporting 8 streams.

TABLE 1

| Stream Number | 1 | 2 | 3 | 4 | 5 | 6 | 7 | 8 |
|---|---|---|---|---|---|---|---|---|
| Purpose | Data placement | Data placement Comp. Eng. 1 | Data placement Comp. Eng. 2 | Data placement Comp. Eng. 3 | Data placement Encrp. Eng. 1 | Data placement Encrp. Eng. 2 | Data placement Search Eng. | Data placement Comp. Eng. 1 Encrp. Eng. 2 |

As shown in table 1, each stream ID may be associated with a particular physical address at the SSD 100. For example, each stream ID may be associated with a different one of the flash memory devices 130. However, embodiments of the present disclosure are not limited thereto, and two or more stream IDs may be associated with a single physical address or memory device 130 within the SSD 100. Additionally, each stream ID may be associated with one or more data processing engines, or not be associated with any data processing engine. For example, in Table 1, stream IDs 1 to 3 are associated with compression engines 1 to 3, stream ID 7 is associated with both the compression engine 1 and the encryption engine 2, and stream ID 8 is not associated with any in-device processing engine.

In some embodiments, when a stream of data arrives at the SSD 100, the SSD controller 110 (e.g. the host interface layer 112) checks the stream ID of the incoming data, and based on the stream assignment table, determines what engines to direct the data to, and if no engine is specified for the stream ID, to bypass the data processor 120 entirely (i.e., to not apply any of the engines in the data processor 120). The bypassing of the compression and encryption engines for stream 8 in the example of Table 1 is also visualized in FIG. 2.

In some embodiments, after applying the appropriate data processing engine, the SSD controller 110 tags each unit of processed data with the appropriate engine ID, and proceeds to store the data in the corresponding location in the memory devices 130, which is based on the corresponding data placement indicated in the stream assignment table. In some examples, once a unit of data is processed by a data processor 120 (e.g., is compressed and/or encrypted), the FTL 114 records the corresponding engine ID(s) in the meta data of the processed data, and stores it along with the processed data in the corresponding memory device(s). In some examples, a unit of data may be a logical page or a group of pages that fit in a mapping entry size (e.g. 4 KB) in FTL.

When the host 20 sends a read request for the stored data, the SSD controller 110 (e.g., the FTL 114) determines what operation was performed on the stored data based on its meta data, and directs the data processor 120 to perform the opposite operation. For example, when the data processor 120 compresses/encrypts a particular stream data during a write operation, the SSD controller 110 automatically instructs the data processor 120 to decompress/decrypt the data when being read back by the host 20.

Knowledge of the stream assignment table allows applications of the host 20 to select an appropriate in-SSD processing when it is beneficial to the host 20 and/or SSD 100, and to bypass (e.g., not apply) in-SSD data processing when such operations confer little to no benefit to the host 20 or the SSD 100. As an example, in the case of Table 1 and FIG. 2, when data from Application C (shown in FIG. 2) has a low compression ratio, such that the SSD 100 cannot benefit from compressing data from application C, the application may select to use stream ID 8, which bypasses (e.g., does not apply) the compression engines of the data processor 120, thus improving the performance (e.g., increase bandwidth) of the multi-stream SSD 100.

As illustrated in Table 1, in some examples, the data processor 120 may include different types of compression engines (e.g., deflate (RFC-1951), ZLIB (RFC-1950), GZIP (RFC-1952), etc.) compression engines and/or different types of encryption engines (e.g., RSA, AES, etc.), a data stream may be routed to compression/encryption engine that best fits the data stream's compression/encryption requirement.

According to some embodiments, the SSD controller 110 is capable of selecting an appropriate stream ID for a given stream. For example, the SSD controller 110 may monitor (e.g., in real time) the compression ratio of a stream undergoing compression, and when the stream's compression ratio is less than a threshold, the SSD controller 110 may redirect the stream to bypass the compression engine, by changing its stream ID (to, e.g., a bypass stream ID). This stream ID change for bypassing purposes may be performed internally and temporarily, and may not be communicated to the host 20. According to some examples, the SSD controller 110 may monitor the data being stored and bypass deduplication if desired.

While FIG. 1 illustrates embodiments in which the data processor 120 is internal to and integrated with the SSD 100, embodiments of the present disclosure are not limited thereto. For example, FIG. 3 illustrates embodiments in which the data processor 120-1 resides at a middleware system 200 external to the SSD 100-1. The middleware system 200 may reside in the cloud, or between a host operating system and the applications running on it. In such examples, the data processor 120-1 may be the same or substantially the same as the data processor 120 of the embodiments of FIG. 1, and the middleware system 200 may include an application interface layer 112-1 that processes I/O requests from the host applications, similar to host interface layer 112 of the embodiments of FIG. 1. In some embodiments, the middleware controller 210 processes the input streams (e.g., performs the stream ID detection process) described above with respect to FIGS. 1 and 2 and is capable of bypassing one or more data-processing engines as described above with respect to FIGS. 1 and 2. The middleware system 200 maintains the stream ID of the processed data so the host interface layer 112 of the multi-stream SSD 100-1 may identify/separate I/O streams based on stream ID and allow streams to be stored at their corresponding locations within the memory devices 130.

perform stream ID-based placement on the processed data received from the middleware system 200, as described above.

FIG. 4 is a flow diagram illustrating a method 300 of processing an input stream in a multi-stream memory system, according to some example embodiments of the present disclosure.

In some embodiments, upon receiving an input stream (e.g., from a host that associates the input stream with a stream ID), the SSD 100 identifies the stream ID of the input stream (S302). The SSD 100 then identifies a first data processing engine among a plurality of data processing engines of an in-device data processor 120 as being associated with the stream ID based on a stream assignment table (S304). The stream assignment table may map a plurality of stream IDs comprising the identified stream ID to the plurality of data processing engines. The SSD 100 then applies the first data processing engine to the input stream to generate processed data, which may be stored within the SSD 100 (S306). In some embodiments, the plurality of data processing engines includes a second data processing engine that is not associated with the stream ID. Here, the SSD 100 identifies the second data processing engine as not being associated with the stream ID based on the stream assignment table, and bypasses (e.g., does not apply) the second data processing engine for the processed data.

It will be understood that the above-described operations performed by the multi-stream SSD 100 or the middleware system 200 and the SSD 100-1 are merely example operations, and the operations performed by these devices may include various operations not explicitly described herein.

The operations performed by the constituent components of the multi-stream SSD (e.g., the SSD controller 110, the data processor 120, etc.) may be performed by a "processing circuit" or "processor" (e.g., a controller processor) that may include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured (e.g., hard-wired) to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept". Also, the term "exemplary" is intended to refer to an example or illustration.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

As used herein, the terms "use", "using", and "used" may be considered synonymous with the terms "utilize", "utilizing", and "utilized", respectively.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A multi-stream memory system comprising:
   an in-device data processor comprising a first data processing engine and a second data processing engine;
   a controller processor; and
   a processor memory coupled to the controller processor, wherein the processor memory has stored thereon instructions that, when executed by the controller processor, cause the controller processor to perform:
   identifying a stream ID of an input stream;
   identifying the first data processing engine as being associated with the stream ID based on a stream assignment table stored at the multi-stream memory system, the stream assignment table mapping the stream ID to the first data processing engine, the first data processing engine comprising at least one of a deduplication engine, a data search engine, and a graphics engine; and
   applying the first data processing engine to the input stream to generate processed data.

2. The multi-stream memory system of claim 1, wherein the stream assignment table comprises a mapping of the stream ID to the first data processing engine and maps another stream ID to the second data processing engine.

3. The multi-stream memory system of claim 1, wherein the first data processing engine is configured to perform an operation different from the second data processing engine.

4. The multi-stream memory system of claim 1, wherein the first data processing engine performs at least one of deduplication, search, and graphics processing.

5. The multi-stream memory system of claim 1, wherein the instructions further cause the controller processor to perform:
   bypassing the second data processing engine for the processed data.

6. The multi-stream memory system of claim 1, wherein the instructions further cause the controller processor to perform:

identifying the second data processing engine as being associated with the stream ID based on the stream assignment table; and in response to the identifying, applying the second data processing engine to the processed data.

7. The multi-stream memory system of claim 1, wherein the in-device data processor is internal to and integrated with a solid state drive (SSD) of the multi-stream memory system comprising the processor memory and the controller processor.

8. The multi-stream memory system of claim 1, wherein the stream assignment table maps the stream ID to a physical address within a memory device of the multi-stream memory system.

9. The multi-stream memory system of claim 1, wherein the instructions further cause the controller processor to perform:

identifying a physical address associated with the stream ID based on the stream assignment table; and storing the processed data at the physical address within a memory device of the multi-stream memory system.

10. The multi-stream memory system of claim 9, wherein the instructions further cause the controller processor to perform:

generating metadata associated with the processed data, the metadata indicating application of the first data processing engine to the input stream; and storing the metadata along with the processed data at the physical address within a memory device of the multi-stream memory system.

11. The multi-stream memory system of claim 1, wherein applying the identified one of the first and second data processing engines comprises:

compressing the input stream by a first compression engine to generate compressed data, and wherein the instructions further cause the controller processor to perform:

monitoring a compression ratio of the compressed data;

determining that the compression ratio is below a threshold; and

In response to the determining, bypassing the identified one of the first and second data processing engines for a remainder of the input stream.

12. The multi-stream memory system of claim 1, wherein the instructions further cause the controller processor to perform:

providing the stream assignment table to an external device, the external device being a source of the input stream.

13. A multi-stream memory system comprising:

an in-device data processor comprising a data processing engine;

a controller processor; and a processor memory coupled to the controller processor, wherein the processor memory has stored thereon instructions that, when executed by the controller processor, cause the controller processor to perform:

identifying a first stream ID of a first input stream;

identifying a second stream ID of a second input stream;

determining that the first stream ID is associated with the data processing engine based on a stream assignment table stored at the multi-stream memory system, the stream assignment table mapping the first stream ID to the data processing engine, the data processing engine comprising at least one of a deduplication engine, a data search engine, and a graphics engine;

applying the data processing engine to the first input stream; and bypassing the data processing engine for the second input stream.

14. The multi-stream memory system of claim 13, wherein the stream assignment table maps the first stream ID to a physical address within a memory device of the multi-stream memory system.

15. The multi-stream memory system of claim 13, wherein the instructions further cause the controller processor to perform:

identifying a physical address associated with the second stream ID based on the stream assignment table; and storing the second input stream at the physical address within a memory device of the multi-stream memory system.

16. A method of processing an input stream in a multi-stream memory system, the method comprising:

identifying, by a controller processor, a stream ID of the input stream;

identifying, by the controller processor, a first data processing engine of an in-device data processor as being associated with the stream ID based on a stream assignment table stored at the multi-stream memory system, the stream assignment table mapping the stream ID to the first data processing engine, the first data processing engine comprising at least one of a deduplication engine, a data search engine, and a graphics engine; and applying, by the controller processor, the first data processing engine to the input stream to generate processed data.

17. The method of claim 16, wherein the stream assignment table comprises a mapping of the stream ID to the first data processing engine.

18. The method of claim 16, further comprising:

bypassing, by the controller processor, a second data processing engine of the in-device data processor for the processed data.

19. The method of claim 16, further comprising:

receiving the input stream from an external device, wherein the external device associates the input stream with the stream ID.

* * * * *